United States Patent [19]

Föhl

[11] Patent Number: 5,039,127
[45] Date of Patent: Aug. 13, 1991

[54] PRETENSIONER IN VEHICLE SAFETY BELT SYSTEMS

[75] Inventor: Artur Föhl, Schorndorf, Fed. Rep. of Germany

[73] Assignee: TRW Repa GmbH, Alfdorf, Fed. Rep. of Germany

[21] Appl. No.: 529,152

[22] Filed: May 25, 1990

[30] Foreign Application Priority Data

Jun. 30, 1989 [EP] European Pat. Off. ........... 89111917

[51] Int. Cl.$^5$ ............................................. B60R 22/18
[52] U.S. Cl. .................................... 280/806; 297/480
[58] Field of Search ................ 280/801, 806; 297/480; 242/107.4 A; 73/514; 180/282

[56] References Cited

U.S. PATENT DOCUMENTS 4,176,810 12/1979 Bertrand et al. ..................... 280/806
4,944,531 7/1990 Knabel et al. ....................... 280/806

FOREIGN PATENT DOCUMENTS 3822253 1/1990 Fed. Rep. of Germany ...... 280/806

Primary Examiner—Richard A. Bertsch
Assistant Examiner—Tamara L. Finlay
Attorney, Agent, or Firm—Tarolli, Sundheim & Covell

[57] ABSTRACT

A retraction element in the form of a pivotally mounted lever or of a linearly slidable slider is mounted on a base plate to be preferably attached to the vehicle seat. The lever or slider is loaded by a strong flat spiral spring, but is held in a stable rest position by a latching device. The latching device consists of two roller body systems functionally connected in series. The first roller body system consists of two outer rolls and an inner, loose roll bearing on one roll of the second system. The second system consists of two outer rolls and an inner roll being situated in an over-dead-center position and mounted on one arm of a double-armed lever whose other arm carries a vehicle sensitive inertial mass. A release threshold may be defined precisely and reproducibly by means of this latching device.

19 Claims, 9 Drawing Sheets

PRETENSIONER IN VEHICLE SAFETY BELT SYSTEMS

FIELD OF THE INVENTION

The invention relates to a pretensioner for vehicle safety belt systems comprising a base plate being attached to the body of the vehicle or to a vehicle seat and a retraction member being movably guided on the base plate and having annexed thereto a connection fitting for the safety belt, a force storage member engaging the retraction member and biasing same in the direction of pretension, and a vehicle-sensitive releasing latching device holding, in locking condition, the retraction member in a rest position against the bias force exerted by the force storage member.

BACKGROUND OF THE INVENTION

Safety belt pretensioners are generally equipped with a pyrotechnical pretensioner drive. Such pretensioners have proven to be very suitable in practice; however, they are expensive and are therefore employed to a limited extent, only.

There is a need for simple safety belt system pretensioners being easy and inexpensive to manufacture, working reliably, and whose use might be widespread due to low manufacturing costs.

One may take into consideration to derive the drive force necessary for pretension from a stressed spring being suddenly unstressed by a vehicle-sensitive release mechanism. But as high drive forces are needed for efficient belt system pretension in order to carry out pretension within a few milliseconds, very strong springs would have to be used.

One has hitherto not succeeded in providing a release mechanism for a spring being dimensioned to be correspondingly strong which keeps releasing safely at a predetermined vehicle deceleration rate even after years of stand-by condition, which may be manufactured to be as simple and inexpensive as the pretensioner itself and at the same time provides for high safety against unwanted release due to bumps, shocks and the like.

It is the underlying object of the invention to provide a pretensioner for safety belt systems which has a simple design and may be manufactured inexpensively, but nevertheless meets high requirements with respect to reliable function and safety against unwanted release.

SUMMARY OF THE INVENTION

This object is met in accordance with the invention by a pretensioner in vehicle safety belt systems, comprising a base plate having means for attachment to a vehicle body or to a vehicle seat, a retraction member movably guided on said base plate between first and second positions, a connecting fitting for a safety belt being joined to the retraction member, a force storage member engaging the retraction member and biasing same in a direction of pretension, and a latching device comprising a vehicle-sensitive inertial body and holding the retraction member in said first position against the bias force exerted by the force storage member and releasing the retraction member in vehicle-responsive manner to enable movement of the retraction member to said second position, said latching device comprising two systems functionally connected in series, each system consisting of three roller bodies respectively bearing on each other with their outer circumference, each of said systems comprising two outer roller bodies, one of which being mounted on the base plate, and an inner, movable roller body whose axis is disposed adjacent a line connecting the axes of the outer roller bodies, said inner roller body of the first system being held in the path of the retraction member while arresting same in its first position, and a double-armed lever being pivotally mounted about a pivot axis on the base plate, said double-armed lever having a first arm mounting the inner roller body of the second system and a second arm engaged by said vehicle-sensitive inertial body.

Each system consisting of three roller bodies in the pretensioner according to the invention basically behaves like a toggle lever mechanism. The inner roller body of the first system tends to yield between the outer roller bodies, but it is held by the inner roller body of the second system in its position where it engages the retraction member and holds same in its rest position against the force exerted by the force storage member. In order to move the inner roller body from the stable over-dead-centre position into an unstable release position, a force has to be exerted whose amount depends on the distance between the inner roller body axis and the line extending through the axes of the two outer roller bodies of each system and which may be calculated precisely. Functional series connection of two such systems achieves that the vehicle-sensitive release may be achieved by means of a relatively small inertial mass of only a few grams. Moreover, the two roller body systems comprise the great advantage of conferring a precisely defined release threshold to the pretensioner which is largely free of outer influences such as manufacturing, assembly and material tolerances. However, expenditure needed for realizing the pretensioner in accordance with the invention is small so that rationalized industrial scale manufacturing is made possible.

In order to reduce frictional influences, the roller bodies may be mounted to rotate smoothly, by means of needle bearings or the like, in particular. Surprisingly, it has been found that even a simple mounting on a pin results in an easily reproducible release threshold.

The one outer roller body in the second roller body system may be formed by the inner roller body of the first system; both of the systems accordingly have one roller body in common. This embodiment constitutes a simplification due to the reduced number of roller bodies required. The inner roller body of the first system is disposed, in locking condition, in the path of the retraction member. In order to ensure a stable rest position, the retraction member in such embodiments is provided with a recess and the outer circumference of the inner roller body of the first system is situated adjacent to the border of this recess.

Two types are basically possible: in a first embodiment, the retraction member constitutes a double-armed lever pivotally mounted on the base plate; in the second embodiment, the retraction member constitutes a slider being linearly and slidably guided on the base plate which is then usefully formed of two plates spaced apart between which the slider is received.

A reverse movement blocking mechanism in the form of a wedge comprising a looking toothing or in the form of a clamping body is advantageously provided in the embodiment comprising a linearly slidable slider. The wedge or clamping body bears on a ramp surface extending to be inclined with respect to the motional direction of the slider and is limited between the two plates so that the wedge or clamping body is guided between the two plates.

Further features and advantages of the invention result from the following description of several embodiments and from the drawings to which reference is made.

DETAILED DESCRIPTION OF THE INVENTION

Figure 1:
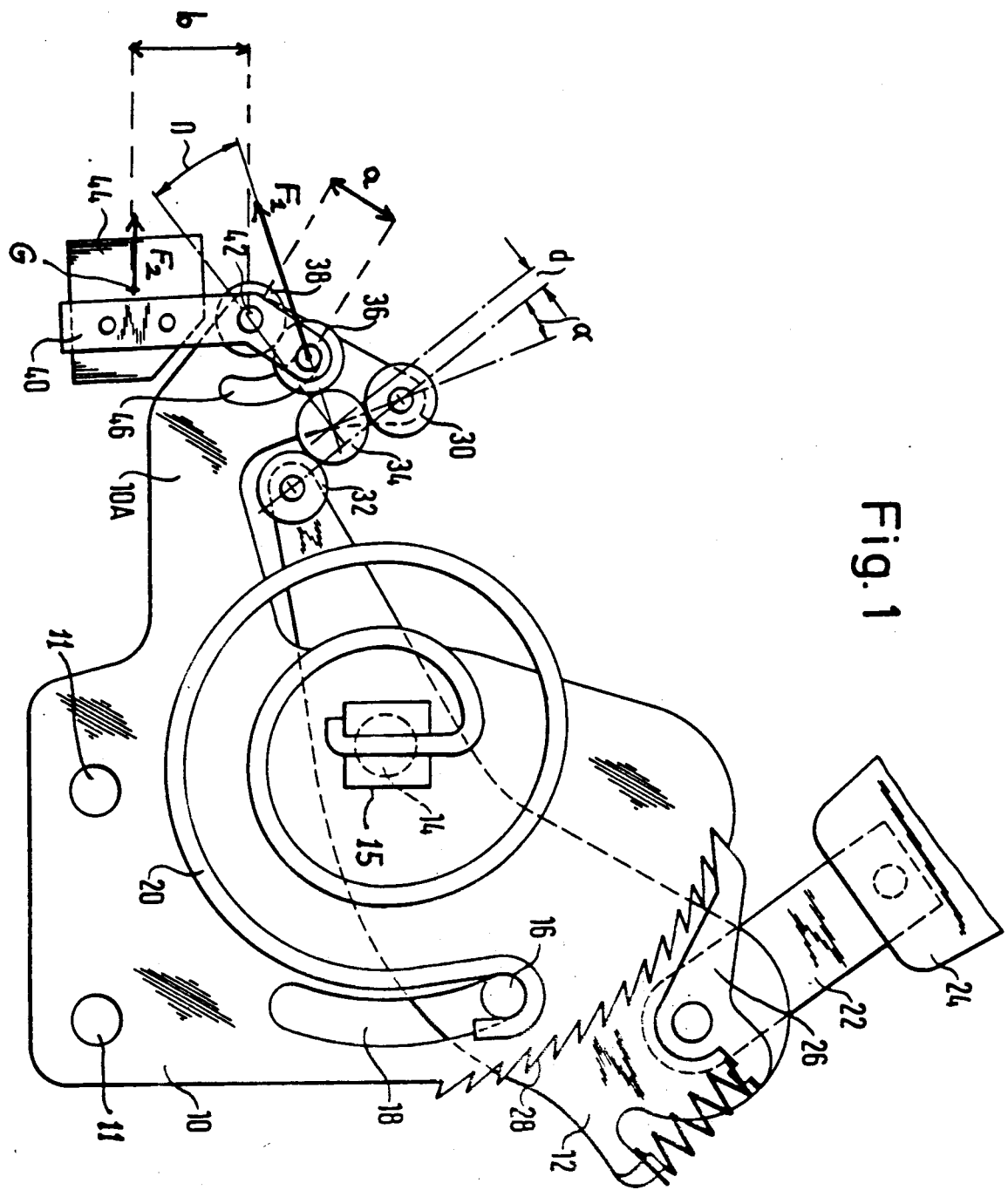
FIG. 1 is a schematic side view of a first embodiment of the pretensioner in rest position.
Figure 2:
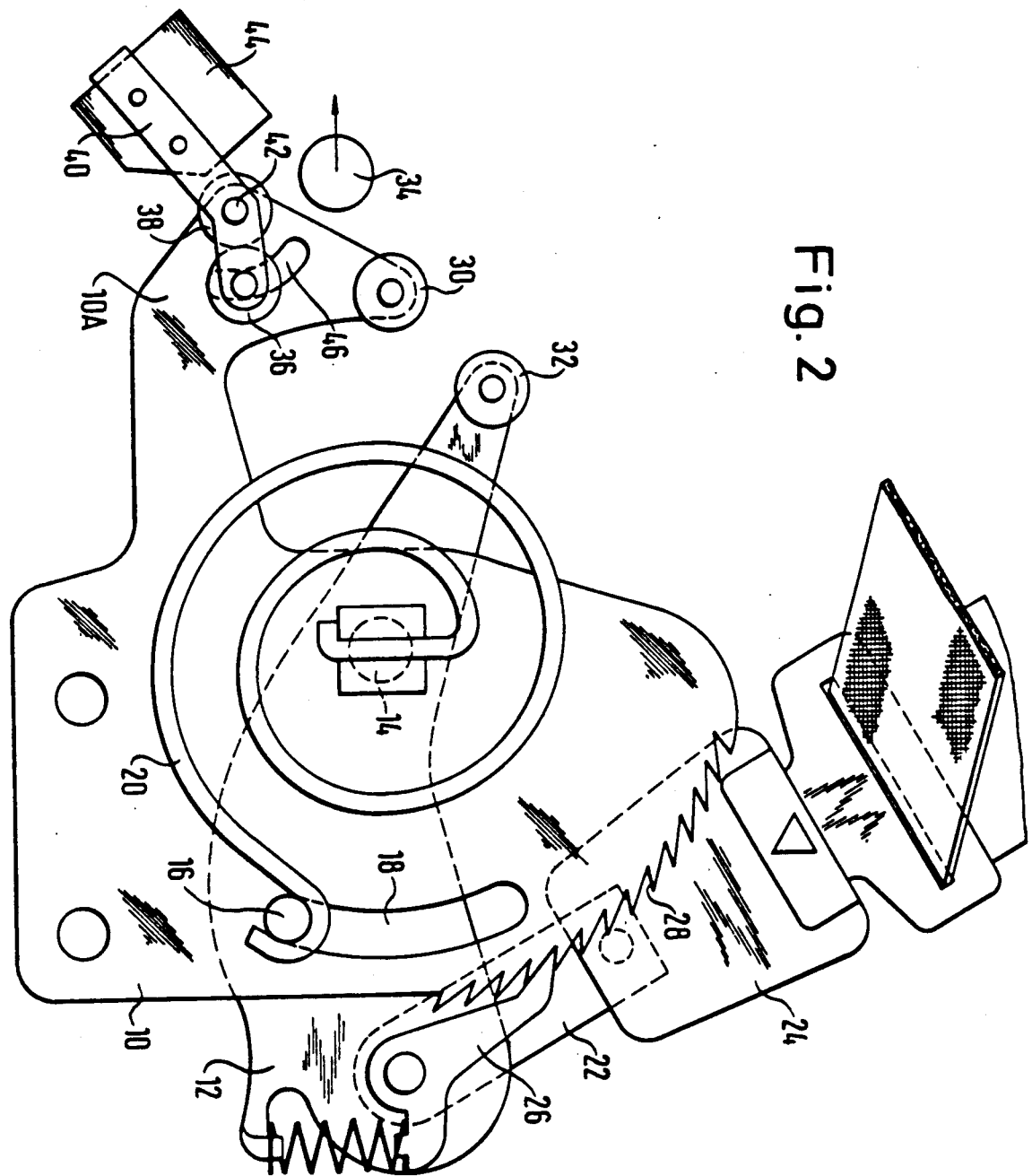
FIG. 2 represents the pretensioner according to FIG. 1 in released condition.
Figure 3:
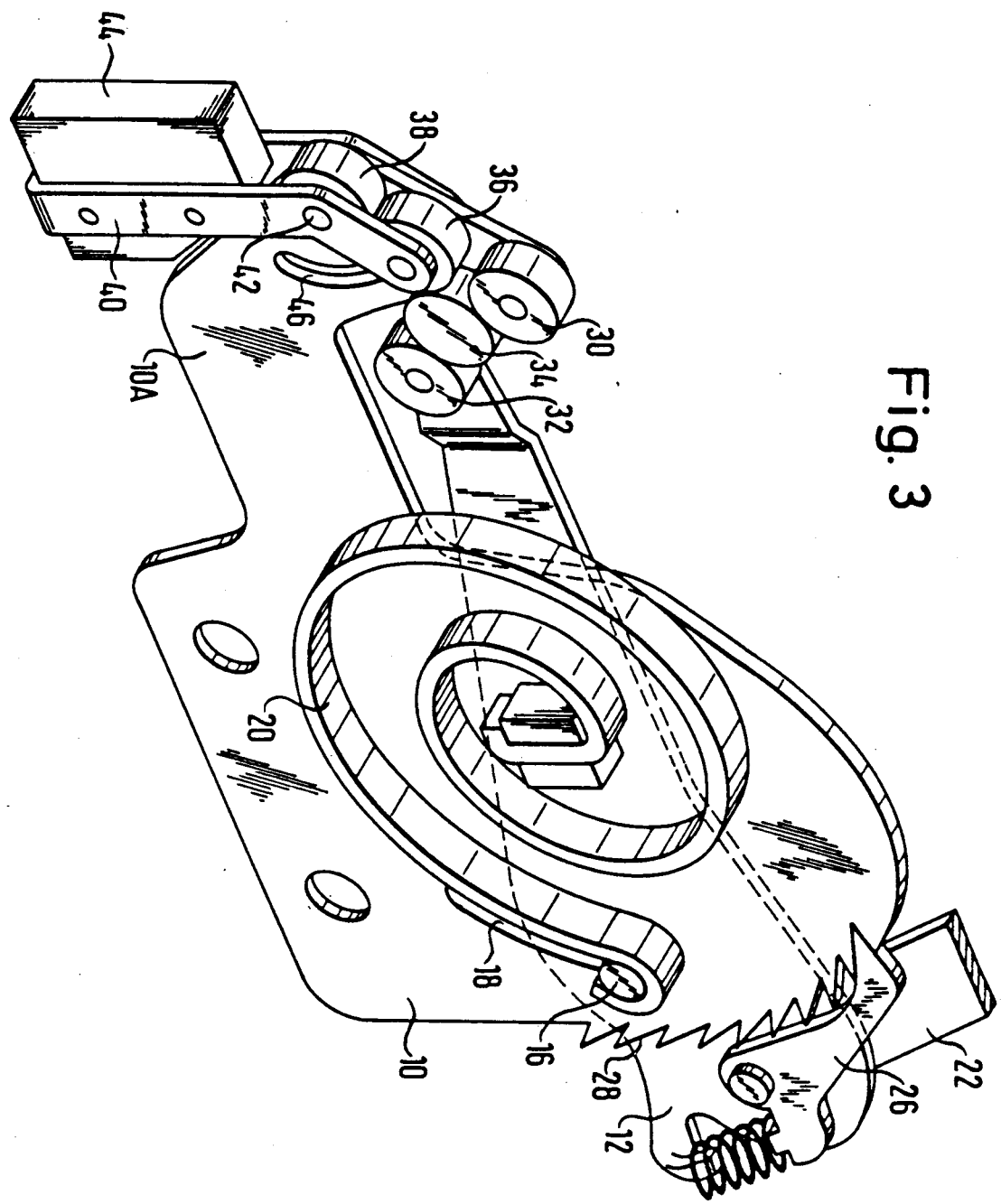
FIG. 3 is a perspective view of the same embodiment in rest condition.

In the embodiment according to FIGS. 1 to 3, a base plate 10 dimensioned so as to be load-bearing is designed for attachment to a vehicle seat or to the vehicle body, for example by means of screw-receiving holes 11. A double-armed lever 12 is mounted onto the base plate 10 to be pivotable about an axis 14. A pin 16 is laterally attached to double-armed lever 12 to penetrate an arc-shaped curved elongated hole 18 of base plate 10, the outer end of a flat spiral spring being hung onto said pin, the inner end of said spring being fixed to the base plate by means of a slotted square block 15. Connecting fitting 22 for a belt lock 24 is attached to one arm of double-armed lever 12. Further, a spring-loaded catch 26 is pivotally mounted on the same lever arm of double-armed lever 12 and cooperates as a reverse movement blocking mechanism with toothing 28 of base plate 10.

Base plate 10 is provided with a bracket 10A mounting a latching device which engages the adjacent end of the second lever arm of double-armed lever 12 for holding the latter in its rest position against the force exerted by flat spiral spring 20. This latching device consists of two systems functionally connected in series, each system comprising three roller bodies respectively. The first system consists of a first outer roll 30 rotatably mounted on bracket 10A, of a second outer roll 32 rotatably mounted on the end of the second lever arm of double-armed lever 12 as well as of an inner roll 34 being loosely held between the two outer rolls 32, 30. Further, inner roll 34 bears, with its outer circumference, on an inner roll 36 of a second system of three roller bodies, a first outer roller body of said second system being constituted by the inner roll 34 of the first system, and a second outer roller body of said second system being constituted by a cylindrical roll 38 being rotatably mounted on bracket 10A. Thus, the second roller body system has one roller body in common with the first system. Inner roller body 36 of the second system is rotatably mounted on the first upper end of a second double-armed lever 40 which, in its turn, is mounted on bracket 10 to be pivotable about an axis 42 corresponding to the mounting axis of roll 38. The second, lower lever arm of second double-armed lever 40 is substantially vertical and formed as a two-legged fork, between whose legs a vehicle-sensitive inertial body 44 is directly attached.

The three roller bodies of each system are disposed in the manner of a toggle lever mechanism, the inner roller body of the second system being situated in a stable over-dead-centre position. Rolls 30, 32 and 34 in the first system are so disposed that the axis of inner, loose roll 34 is located at a distance d from a line extending through the axes of rolls 30, 32. The relative position of the inner, loose roll 34 with respect to outer rolls 30, 32 may also be characterized by an angle $\alpha$ by which the line extending through the axes of rolls 30 and 34 is inclined relative to a line extending through the axes of the outer roll 30 and 32.

The second roller body system consists of rolls 34, 36 and 38. Inner roll 36 is situated in an over-dead-centre position being defined by the fact that the axis on which roll 36 is rotatably mounted abuts the upper end of an arc-shaped curved elongated hole 46 in base plate 10. Thus, elongated hole 46 acts as a stop against pivotal counter-clockwise movement of lever 40 in FIG. 1. The over-dead-centre position of roll 36 is further defined by an angle of inclination $\beta$ between the lines extending through the axes of rolls 38 and 34, on the one hand, as well as through the axes of rolls 34 and 36, on the other hand.

Finally, the lines extending through the axes of the outer rolls in the first and the second systems are generally perpendicular to each other.

In order to show this fact clearly, angles $\alpha$ and $\beta$ are shown in an exaggerated scale in FIG. 1.

Referring also to FIG. 2, the mode of operation of the device shown in FIG. 1 is described in the following. Flat spiral spring 20 applies a high clock-wise torque to double-armed lever 12 which corresponds to a pretension force in the order of magnitude of about 500 to 1500N acting, in case of release, upon connecting fitting 22 and upon belt lock 24. Double-armed lever 12 pushes against the outer circumference of the middle, loose roll 34 of the first system via roll 32 so that this roll tends to shift against inner roll 36 of the second system. However, roll 36 counteracts this tendency as being situated in a stable over-dead-centre position, in its turn, between rolls 34, 38 and being unable to yield as its pivotal path is limited by the upper end of elongated hole 46. The holding force $F_1$ necessary for preventing inner roll 34 of the first system from yielding is only a fraction of the force exerted by roll 32 bearing on roll 34 since angle $\alpha$ or distance d are dimensioned to be small, and the line extending through the axes of rolls 32 and 30 is nearly tangential to the path of roll 32.

Assuming that roll 32 is pressed against roll 34 with a force of 1000N, and angle $\alpha$ is 5°, the required holding force $F_1$ which roll 36 must exert onto roll 34 has to be calculated as follows if one neglects rolling friction:

$$F_1 = 2 \times 1000N \times tg\,\alpha = 175N.$$

In case of abrupt deceleration, this holding force $F_1$ must be overcome by the second system of roller bodies. The mass m of vehicle-sensitive inertial body 44 required for generating the necessary triggering force $F_2$ may be calculated as follows:

Length a be the length of the upper lever arm of lever 40 between the axes of rolls 36 and 38. Further, b be the length of the lever arm between the centre of gravity G of vehicle-sensitive inertial body 44 and axis 42. If lever arms a and b are chosen to be of approximately equal lengths, if an angle $\beta$ having about 2.5° is chosen as well as a release threshold for the deceleration of about ten times the gravity acceleration for vehicle-sensitive pretension release, there results:

$$F_2 = F_1 \times 2 \times tg\beta = 100\text{N} \times tg\,\beta = 15.3\text{N}$$

and $$m = \frac{15.3 \text{ N s}^2}{10 \times 9.81 \text{ Nm}} \, 0.156 \text{ kg}.$$

Thus, vehicle-sensitive inertial body 44 has to comprise a mass situated in the order of magnitude of 0.1 to 0.2 kg.

Thus, if a vehicle deceleration of about ten times the gravity acceleration or more occurs, the threshold force at which roll 36 is held to abut the upper end of elongated hole 46 is overcome. Lever 40 is pivoted clockwise so that roll 36 moves between rolls 38 and 34 and, in the process, attains a position wherein the pressure force exerted onto it generates a force component corresponding to a torque being directed to be clock-wise at lever 40. As soon as this position is attained, the system turns unstable: the farther lever 40 is pivoted clockwise, the larger is the torque supporting its pivotal movement which is transferred by flat spiral spring 20 to roll 36 via rolls 32 and 34. Now, loose inner roll 34 of the first roller body system may also yield between the two outer rolls 30, 32 of this system with angle $\alpha$ being enlarged. Now the system is free as a whole. Loose roll 34 is flung out from between rolls 30 and 32. Roll 32 does no longer meet an obstacle so that lever 12 is clock-wise pivoted by flat spiral spring 20, and connecting fitting 22 together with belt lock 24 is moved downwards until balance of forces with the belt tension has been reached or until pin 16 is stopped on the lower limit of elongated hole 18.

The processes described happen within a very short period of time of a few milliseconds only. FIG. 2 shows the condition of the pretensioner after pretension operation has been completed. Loose roll 34 is flung away and may be caught by a jacket, for instance.

The distance covered by roll 36 until reaching an unstable position starting from its over-dead-centre position is in a fixed relationship with acceleration and the period of time lapsing until release. The period of time is at about 10 ms for a distance of 1 mm and an average vehicle deceleration of ten times the gravity acceleration. One important characteristic of the system consists in the fact that accelerations acting shortly such as those due to bumps or vibrations cannot result in unwanted release as the product of mean acceleration and acting time remains small.

Further, in the looking position, it is preferred that the line extending through the centre of gravity G of the inertial body 44 and the pivot axis 42 of the double-armed lever 40 is inclined backwards by a few degrees with respect to the vertical, opposite to the normal travel direction.

In the embodiments according to FIGS. 4 to 7 as well as in the one according to FIG. 8, the retraction member engaging belt lock 24 is not formed to be a double-armed pivotally mounted lever, but a linearly slidable guided member which is designated by "slider" in the following and which is provided with reference numeral 50 in the drawing.

This slider 50 is guided between base plate 10 and a plate 10B spaced apart from it by spacer 52. Base plate 10 comprises an elongated hole 54 being penetrated by pin 56 attached to slider 50. On pin 56, there is supported the outer end of flat spiral spring 20 whose inner end is held on a square block 14 being attached to base plate 10. Connecting fitting 22 for the belt look 24 is linked to the upper end of slider 50. Base plate 10 and plate 10B are respectively provided with elongated holes 58 or 60. Elongated holes 58, 60 being parallel with respect to each other serve as a ramp means for guiding locking wedge 62 whose two laterally joined ribs are guided in elongated holes 58, 60. Locking wedge 62 is guided through elongated holes 58, 60 obliquely with respect to the motional direction of slider 50 and is, on its edge facing the slider, provided with a locking toothing 64 cooperating with a corresponding locking toothing 66 of slider 50. Locking wedge 62 is biased against slider 50 by a leaf spring 68. Locking toothings 64, 66 are formed so as to admit downward movement of slider 50 but so as to lock oppositely directed reverse movement.

Base plate 10 comprises, on its upper end, a bracket 10A where a double-armed lever 40 is mounted on an axis 42 whereon a roll is rotatably mounted, too. As is done in the embodiment according to FIGS. 1 to 3, a vehicle-sensitive inertial body 44 is attached to lever 40. Further, as in the embodiment according to FIGS. 1 to 3, a movable roll 36 is rotatably mounted on the upper lever arm of lever 40. Further, a roll 30 is rotatably mounted on base plate 10, said roll forming a system of three roller bodies together with roll 36 and a loose roll 34. Loose roll 34 hears, with its outer circumference, against the border 69 of a recess 70 of slider 50.

The four rolls 30, 34, 36, and 38 form two systems of three roller bodies respectively comprising two outer bodies and one inner body, the inner roller body in the second system being situated in an over-dead-centre position. The arrangement corresponds to the one in the embodiment according to FIGS. 1 to 3, but roll 32 of the above-described embodiment has been left away as slider 50 is not provided with a supporting roll, but with a border 69 in recess 70. The first roller body system consists of rolls 30, 34, and 36; the second system consists of rolls 34, 36, and 38. Both systems are functionally connected in series as in the embodiment according to FIGS. 1 to 3 and substantially effect the definition of a release threshold precisely determined to be reproducible. The mass of inertial body 44 is situated in the same order of magnitude as the one in the above-specified embodiment. However, one roll, that is, roll 32 of the first embodiment is dispensed with.

Figure 4:
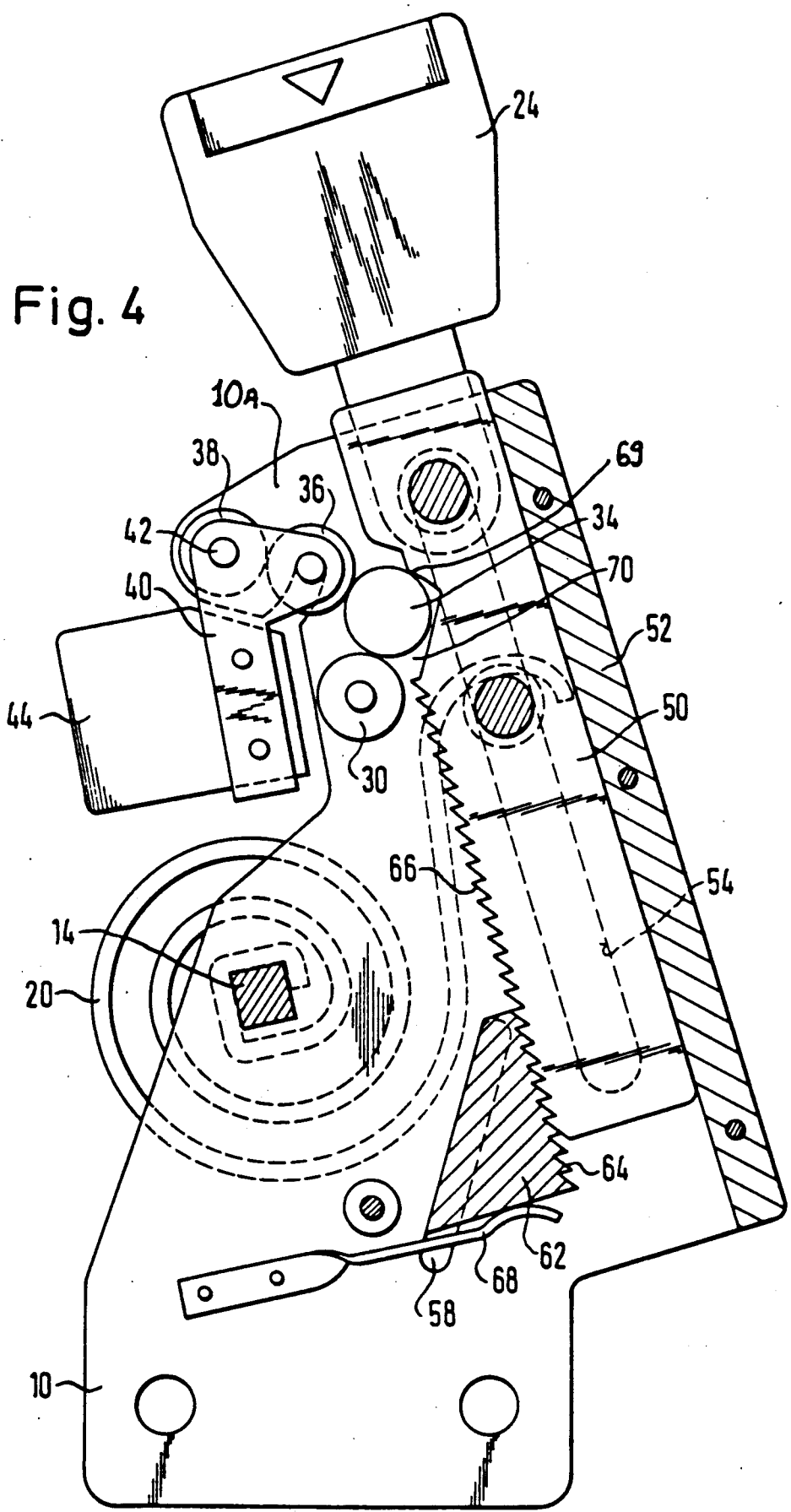
FIG. 4 is a schematic sectional view cf a second embodiment of the pretensioner in rest condition.
Figure 5:
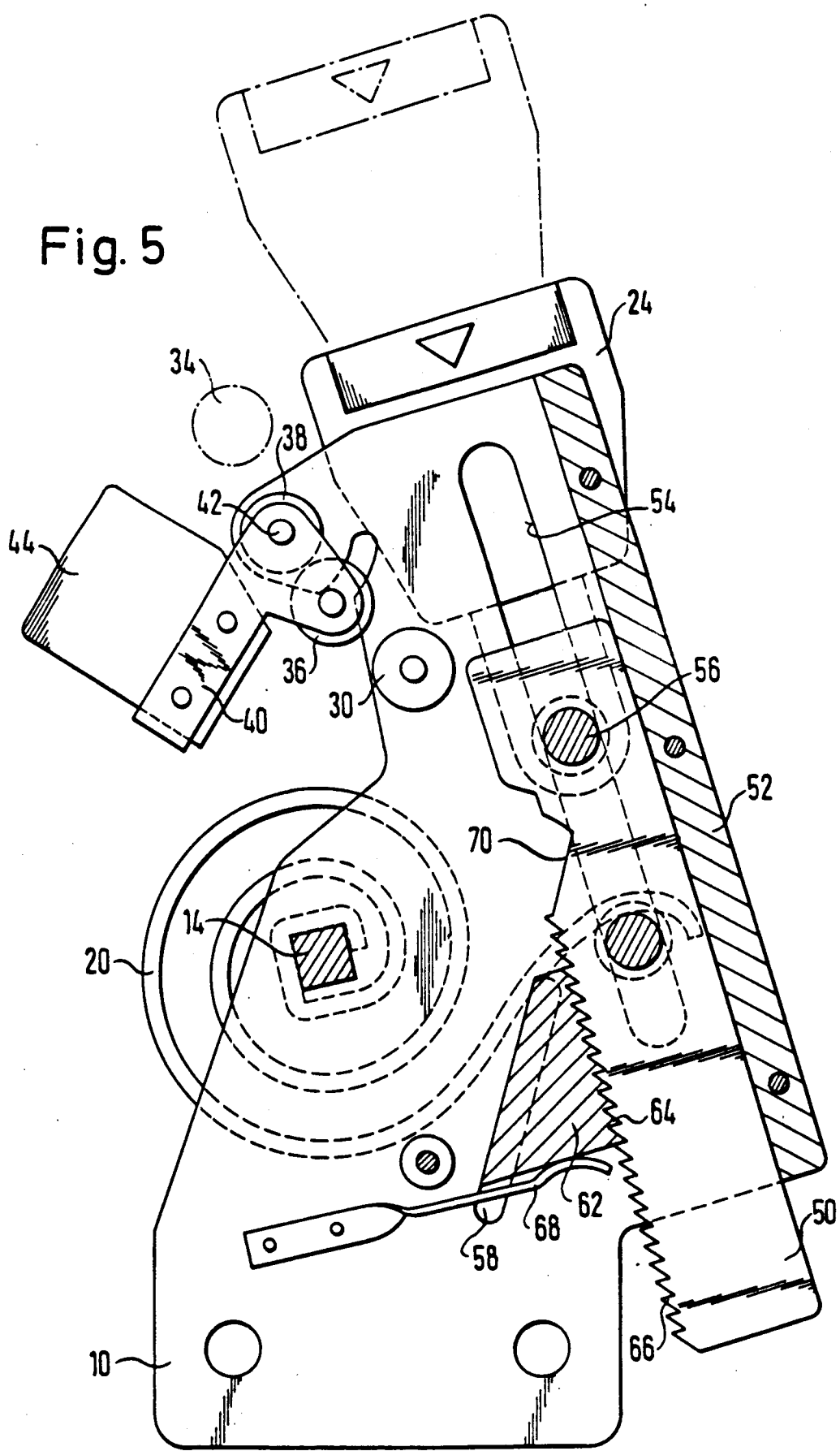
FIG. 5 is a corresponding view of this embodiment in released condition.
Figure 6:
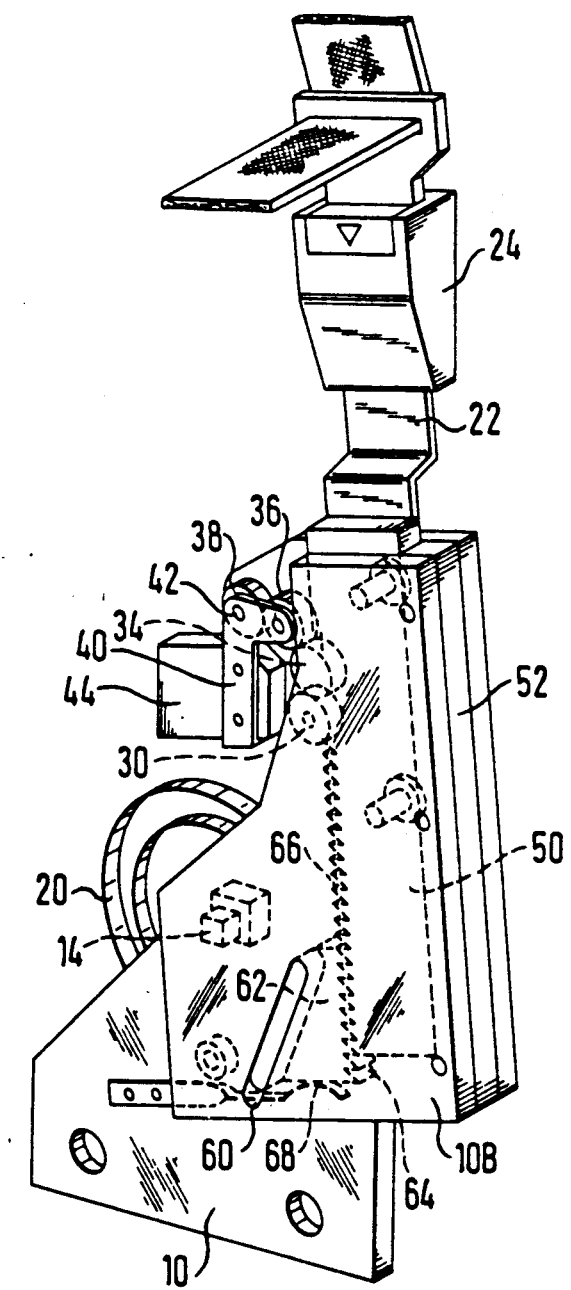
FIG. 6 is a schematic overall view of the pretensioner according to FIGS. 4 and 5.
Figure 7:
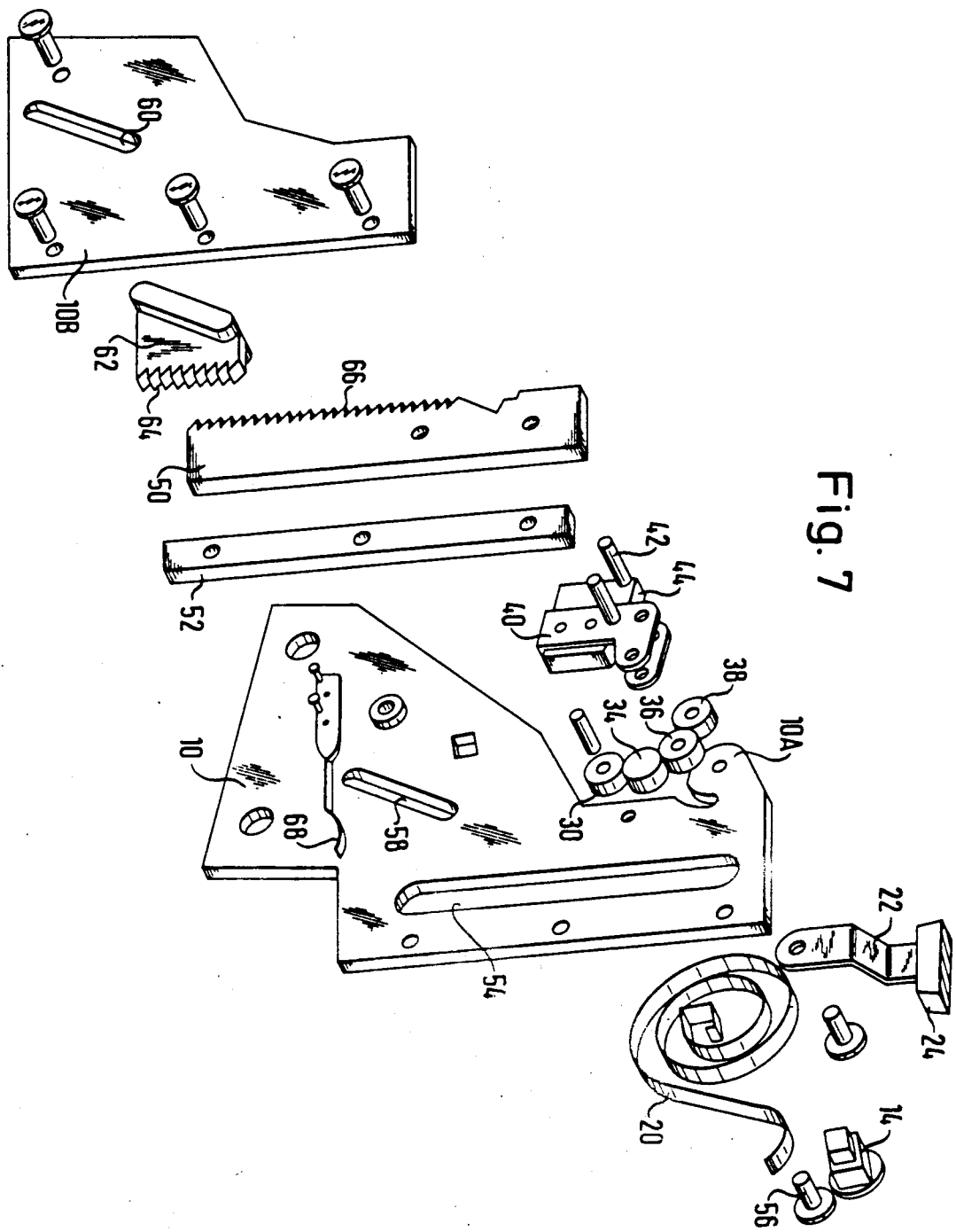
FIG. 7 is an exploded perspective view of the pretensioner according to FIGS. 4 to 6.

The mode of operation of the latching device constituted by the two systems of roller bodies is basically the same as in the embodiment specified in the foregoing and therefore is not explained anew. FIG. 4 shows the pretensioner in rest position; FIG. 5 shows the same pretensioner in release position wherein slider 50 is shifted downwards through the force exerted by flat spiral spring 20, and locking wedge 62 prevents slider 50 from moving backwards.

Figure 8:
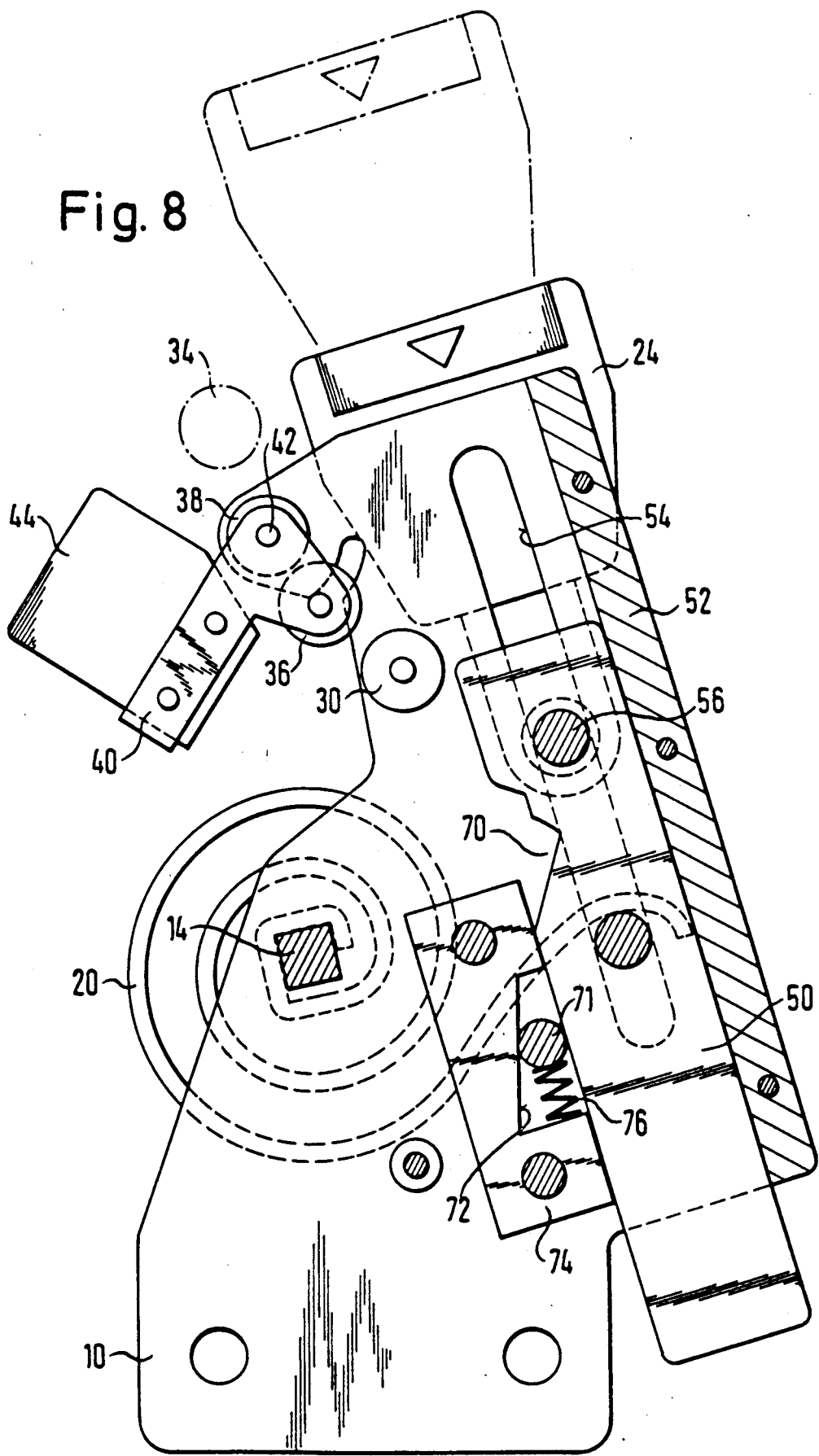
FIG. 8 shows a modified embodiment of the pretensioner according to FIGS. 4 to 7.

The embodiment shown in FIG. 8 differs from the one according to FIGS. 4 to 7 only in the design of the reverse movement blocking mechanism. Here, the latter is a clamping body formed by a cylindrical roller body 71 preferably made of hardened material and a ramp surface 72 on a guiding member 74 held between base plate 10 and plate 10B. Ramp surface 72 is inclined obliquely with respect to the sliding direction of slider 50. Roller body 71 is biased up ramp surface 72 and, accordingly, against the adjacent front edge of slider 50. It is immediately apparent that roller body 71 does not prevent slider 50 from moving downwards, but prevents the oppositely directed reverse movement, wherein a certain plastic deformation of the adjacent front face of slider 50 may occur, and reverse movement locking is even further increased.

Figure 9:
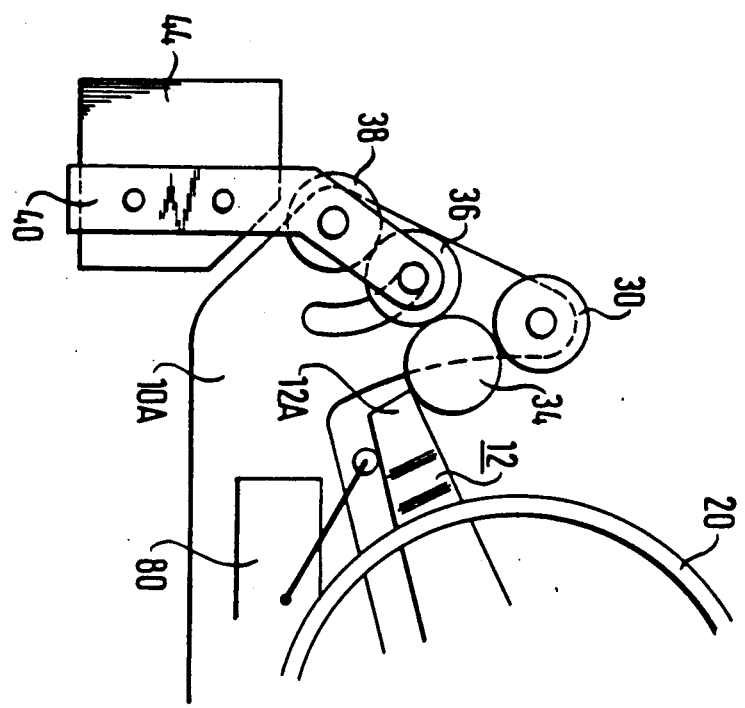
FIG. 9 is a partial view of one modified embodiment of the pretensioner according to FIGS. 1 to 3.
Figure 9:
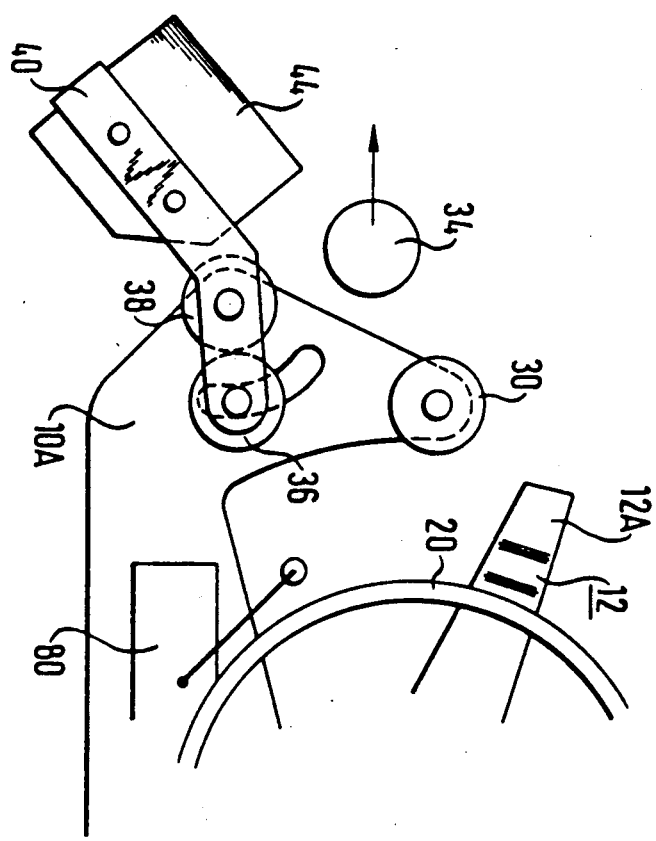

The embodiment shown in FIG. 9 differs from the one according to FIGS. 1 to 3 only in that roll 32 situated on the end of double-armed lever 12 has been left away. The end of lever 12 is directly supported on loose roll 34 with an edge 12A. In this embodiment, the first roller body system is formed by rolls 30, 34, and 36, and the second system is formed by rolls 38, 36, and 34. The embodiment of the latching device is formed by analogy with the one according to FIGS. 4 to 8. In total, the two roller body systems consist of four rolls only, two of which being common to both systems. FIG. 9 shows the rest position on the left side and the release position on the right. The arrangment has been contrived so that edge 12A of lever 12 may be moved unhindered past roll 30 after roll 34 has been flung away.

Since the mode of operation basically corresponds to the one in the embodiment according to FIGS. 1 to 3, it is not described anew.

In the embodiment shown in FIG. 9, the position of lever 12 is scanned by a sensor being represented as microswitch 80 with rest contact. If micro-switch 80 is non-actuated, a circuit is closed which activates a display device such as a warning lamp in order to inform the vehicle user about the fact that the pretensioner has been released and is not operative, accordingly. Obviously, such a microswitch may he also provided in any one of the previous embodiments.

I claim:

1. A pretensioner in vehicle safety belt systems, comprising a base plate having means for attachment to a vehicle body or to a vehicle seat, a retraction member movably guided on said base plate in a path between first and second positions, a connecting fitting for a safety belt being joined to the retraction member, a force storage member engaging the retraction member and biasing the retraction member in a direction of pretension, and a latching device comprising a vehicle-sensitive inertial body and holding the retraction member in said first position against the bias force exerted by the force storage member and releasing the retraction member in vehicle-responsive manner to enable movement of the retraction member to said second position, said latching device comprising two systems functionally connected in series, each system consisting of three roller bodies respectively hearing on each other with their outer circumference, each of said systems comprising two outer roller bodies, one of which being mounted on the base plate, and an inner, movable roller body whose axis is disposed adjacent a line connecting the axes of the outer roller bodies, said inner roller body of the first system being held in the path of the retraction member while arresting the retraction member in its first position, and a double-armed lever being pivotally mounted about a pivot axis on the base plate, said double-armed lever having a first arm mounting the inner roller body of the second system and a second arm engaged by said vehicle-sensitive inertial body.

2. A pretensioner according to claim 1, wherein said inner roller body of the first system is loosely held between the outer roller bodies of this first system.

3. A pretensioner according to claim 1, wherein said vehicle-sensitive inertial body is attached directly to the second arm of the double-armed lever.

4. A pretensioner according to claim 1, wherein a line extending through the centre of gravity of the vehicle-sensitive inertial body and the pivot axis of the double-armed lever is inclined backwards by a few degrees with respect to the vertical, opposite to the normal travel direction.

5. A pretensioner according to claim 1, wherein a stop is provided in the base plate for defining a rest position of the inner roller body between the outer roller bodies of the second system.

6. A pretensioner according to claim 1, wherein one of the outer roller bodies of the second system is also mounted on the pivot axis of the double-armed lever.

7. A pretensioner according to claim 1, wherein the second arm of the double-armed lever is designed in the form of a two-legged fork between whose legs the vehicle-sensitive inertial body is attached and the inner roller body of the second system is mounted on the first arm.

8. A pretensioner according to claim 1, wherein the retraction member is a double-armed lever being pivotally mounted on the base plate and having a first and a second arm, the connecting fitting being joined to the first arm of said double-armed lever on the retraction member, and the second arm of the double arm lever of the retraction member bearing on the inner roller body of the first system.

9. A pretensioner according to claim 8, wherein the second arm of the retraction member mounts an outer roller body of the first system, which outer roller body bears on the inner roller body of said first system.

10. A pretensioner according to claim 8, wherein the second arm of the retraction member is provided with an edge, the edge bearing on the inner roller body of the first system.

11. A pretensioner according to claim 1, and further comprising a sensor for detecting the position of the retraction member.

12. A pretensioner in vehicle safety belt systems, comprising a base plate having means for attachment to a vehicle body or to a vehicle seat, a retraction member movably guided on said base plate in a path between first and second positions, a connecting fitting for a safety belt being joined to the retraction member, a force storage member engaging the retraction member and biasing the retraction member in a direction of pretension, and a latching device comprising a vehicle-sensitive inertial body and holding the retraction member in said first position against the bias force exerted by the force storage member and releasing the retraction member in vehicle-responsive manner to enable movement of the retraction member to said second position, said latching device comprising two systems functionally connected in series, each system consisting of three roller bodies respectively bearing on each other with their outer circumference, each of said systems comprising two outer roller bodies, one of which being mounted on the base plate, and an inner, movable roller body whose axis is disposed adjacent a line connecting the axes of the outer roller bodies, said inner roller body of the first system being held in the path of the retraction member while arresting the retraction member in its first position, and a double-armed lever being pivotally mounted about a pivot axis on the base plate, said double-armed lever having a first arm mounting the inner roller body of the second system and a second arm engaged by said vehicle-sensitive inertial body, and the retraction member being a sliding member guided on the base plate to be linearly slidable.

13. A pretensioner according to claim 12, wherein the sliding member being guided to be linearly slidable comprises a recess having a border abutted by the inner roller body of the first system, and that one of the outer roller bodies of the first system is formed by the inner roller body of the second system.

14. A pretensioner according to claim 12, wherein the base plate is formed of two spaced apart plates between which the sliding member is disposed.

15. A pretensioner according to claim 14, and further comprising a locking member located between the two plates and guided by a ramp means obliquely with respect to the direction of motion of the sliding member and biased towards the sliding member by spring tension, said locking member allowing movement of the sliding member from its first position to the second position, but locking reverse movement of the sliding member to the first position.

16. A pretensioner according to claim 15, wherein said locking member is formed as a wedge, and said wedge and said sliding member having mutually facing surfaces provided respectively with a locking toothing and a counter-toothing.

17. A pretensioner according to claim 15, wherein the locking member is formed as a clamping body.

18. A pretensioner according to claim 17, wherein the clamping body is formed by a roller body made of hardened material and the sliding member having an opposing abutment surface made of a material which can be plastically deformed under a load exerted by the said roller body.

19. A pretensioner according to claim 12, and further comprising a sensor for detecting the position of the retraction member.

* * * * *

UNITED STATES PATENT AND TRADEMARK OFFICE
CERTIFICATE OF CORRECTION

PATENT NO. : 5,039,127
DATED : August 13, 1991
INVENTOR(S) : Artur Föhl

It is certified that error appears in the above-identified patent and that said Letters Patent is hereby corrected as shown below:

Column 7, Line 59, Claim 1 change "hearing"
to --bearing--.

Column 8, Line 33, Claim 8, change "on"
to --of--.

Signed and Sealed this

Twenty-second Day of December, 1992

Attest:

DOUGLAS B. COMER

*Attesting Officer*     *Acting Commissioner of Patents and Trademarks*